S. R. BERGMAN.
SINGLE PHASE MOTOR.
APPLICATION FILED JUNE 5, 1908.

924,725.

Patented June 15, 1909.

Witnesses:
George W. Tilden
J. Ellis Glen.

Inventor
Sven R. Bergman,
by
Atty.

UNITED STATES PATENT OFFICE.

SVEN R. BERGMAN, OF LYNN, MASSACHUSETTS, ASSIGNOR TO GENERAL ELECTRIC COMPANY, A CORPORATION OF NEW YORK.

SINGLE-PHASE MOTOR.

No. 924,725.

Specification of Letters Patent.

Patented June 15, 1909.

Application filed June 5, 1908. Serial No. 436,834.

*To all whom it may concern:*

Be it known that I, SVEN R. BERGMAN, a subject of the King of Sweden, residing at Lynn, in the county of Essex, State of Massachusetts, have invented certain new and useful Improvements in Single-Phase Motors, of which the following is a specification.

My invention relates to single-phase motors of the induction type having self-starting characteristics.

One well known arrangement for rendering a single-phase motor self-starting consists in providing the primary member with a main winding and a starting winding displaced from each other; the main winding being of comparatively high reactance and low resistance, and the starting winding of low reactance and high resistance. The starting winding ordinarily has a large number of turns, and is wound with smaller wire than the main winding, and, in addition, in order to give the windings different reactances per turn, the slots containing the two windings have sometimes been of different shape. Such a construction has the disadvantage that the number of poles is fixed by the arrangement of slots, so that the same primary member cannot be used for motors of different numbers of poles. By my invention I am enabled to obtain the same results as though the slots were of different shapes, and yet employ uniform slots, so that the same stator may be used for different pole numbers.

My invention consists in arranging the stator with open slots, placing the main winding in certain of the slots and the starting winding in the remaining slots, and employing magnetic wedges to close the slots occupied by the main winding, and non-magnetic wedges for the slots containing the starting winding. Since the starting winding is wound with smaller wire than the main winding, the cross-section of the coils of the starting winding may sometimes be less than the cross-section of the slots. In such a case, my invention further consists in arranging the coils of the starting winding in the tops of the slots they occupy, and filling the bottoms of the slots with pieces of wood or other non-magnetic material, thereby further decreasing the reactance of the starting winding.

My invention will best be understood by reference to the accompanying drawings, in which—

Figure 1:
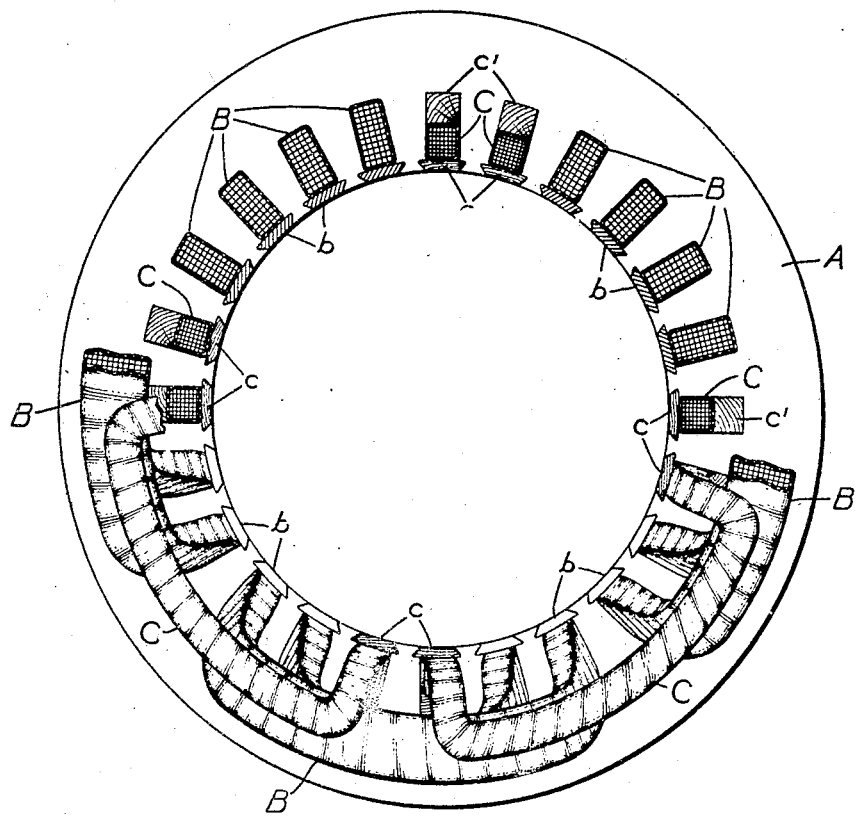
Figure 2:
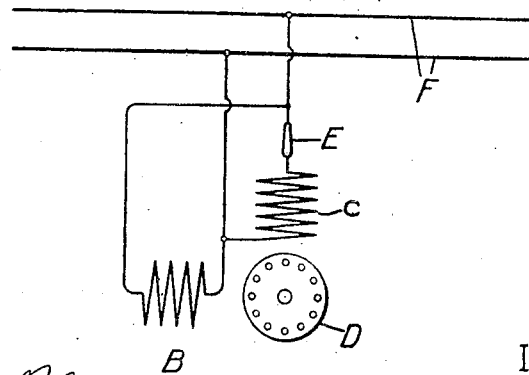

Figure 1 shows an end view, partly in cross-section, of the primary member of a single-phase induction motor arranged in accordance with my invention, and Fig. 2 is a diagram of the connections of the windings of the primary member.

In the drawings, A represents the stator, which as usual is constructed of laminations, and which is formed with uniform open slots. In certain of these slots, the coils B of the main winding are placed, and in the remaining slots are the coils C of the starting winding. These latter coils are of smaller wire than the main coils, and consequently have a higher resistance. The slots containing the main winding B are closed with wedges b, of magnetic material. These wedges, which may be constructed of wire gauze as disclosed in my former patent No. 872,324, issued December 3, 1907, form a path of low reluctance for the flux of the main winding, and, consequently, give this winding a high reactance. The wedges c, of the slots occupied by the starting winding, are made of non-magnetic material, such as wood. The coils C are placed in the tops of the slots, and the bottoms of the slots are filled by pieces of wood, or other non-magnetic material, c'. This arrangement of the coils of the starting winding gives them a comparatively low reactance. Furthermore, since all the slots are uniform, the number of poles is not fixed, but the same laminations may be employed for motors of different pole-numbers.

Fig. 2 shows the connections of the windings, the main winding B and starting winding C are connected in parallel. D represents the secondary member, which is indicated diagrammatically as of the squirrel-cage type, E represents a switch for opening the circuit of the starting winding after the motor is up to speed, and F represents the supply conductors for the motor.

I do not desire to limit myself to the particular construction and arrangement of parts here shown, but aim in the appended claims to cover all modifications which are within the scope of my invention.

What I claim as new and desire to secure by Letters Patent of the United States, is—

1. In a single-phase induction motor, a primary member formed with open slots, a low-resistance main winding distributed in certain of said slots, a high-resistance starting winding in the remaining slots, wedges of magnetic material closing the slots occupied by the main winding, and wedges of non-magnetic material for the slots occupied by the starting winding.

2. In a single-phase induction motor, a primary member formed with uniform open slots, a low-resistance main winding distributed in and filling certain of said slots, a high-resistance starting winding located in the tops of the remaining slots, non-magnetic means for filling the bottoms of the latter slots, wedges of magnetic material closing the slots occupied by the main winding, and wedges of non-magnetic material for the slots occupied by the starting winding.

In witness whereof, I have hereunto set my hand this third day of June, 1908.

SVEN R. BERGMAN.

Witnesses:
JOHN A. McMANUS, Jr.,
CHARLES A. BARNARD.